United States Patent [19]

Ananiades et al.

[11] 3,835,252

[45] Sept. 10, 1974

[54] SIGNAL TRANSMISSION SYSTEM OVER BIDIRECTIONAL TRANSMISSION LINE

[75] Inventors: Constantine S. Ananiades, Pasadena; Kenneth D. Krossa, Sierra Madre, both of Calif.

[73] Assignee: Burroughs Corporation, Detroit, Mich.

[22] Filed: July 20, 1973

[21] Appl. No.: 381,263

Related U.S. Application Data

[63] Continuation of Ser. No. 774,645, Nov. 12, 1968, abandoned.

[52] U.S. Cl. .................................. 178/68, 340/177

[51] Int. Cl. ........................................... H04l 15/00

[58] Field of Search ............ 178/68, 66 R, 69 R, 63, 178/16; 307/270, 8, 12, 44, 54, 60; 340/147 CN, 150, 177

[56] References Cited

UNITED STATES PATENTS

| | | | |
|---|---|---|---|
| 3,470,542 | 9/1969 | Trantanella | 340/150 |
| 3,497,619 | 2/1970 | Babcock | 178/68 |
| 3,518,628 | 6/1970 | Giel et al. | 340/150 |
| 3,619,504 | 11/1971 | DeVeer | 178/68 |
| 3,671,671 | 6/1972 | Wantanabe | 178/68 |
| 3,751,591 | 8/1973 | Radcliffe | 178/68 |

*Primary Examiner*—Kathleen H. Claffy
*Assistant Examiner*—Douglas W. Olms
*Attorney, Agent, or Firm*—Christie, Parker & Hale

[57] ABSTRACT

A signal transmission and receiving system. A transmission line is bidirectional along its length. An impedance element terminates each end of the transmission line. Line drivers each have an output circuit connected at a respective point on the transmission line. Each line driver has a first state presenting an open circuit and a second state for applying a current signal on the transmission line. A receiver has an input connected to the transmission line and responds to the presence or absence of a voltage signal exceeding a predetermined threshhold caused by any one of the line drivers for forming corresponding output signals. Each line driver is characterized in the second state for changing the current on the transmission line so as to change in a predetermined direction the voltage level, if any, on the transmission line caused by current from another line driver.

11 Claims, 3 Drawing Figures

INVENTORS.
CONSTANTINE S. ANANIADES
KENNETH D. KROSSA
BY
Christie, Parker & Hale
ATTORNEYS.

INVENTORS.
CONSTANTINE S. ANANIADES
KENNETH D. KROSSA
BY
Christie, Parker & Hale
ATTORNEYS.

SIGNAL TRANSMISSION SYSTEM OVER BIDIRECTIONAL TRANSMISSION LINE

CROSS REFERENCE TO RELATED APPLICATIONS

This is a continuation of Application Ser. No. 774,645, filed Nov. 12, 1968 now abandoned.

BACKGROUND OF THE INVENTION

This invention relates to data processing systems and, more particularly, to a high speed signal transmission system for transfer of digital signals between units in the data processing system.

Modern data processing systems have a number of different units between which communication must be effected at high rates. Communication is made through coded digital signals. It has become necessary to increase the speed with which digital signals are transmitted between units. In order to allow for the increased speed of communication, it has become necessary to transmit the digital signals on transmission lines terminated in the characteristic impedance of the transmission line.

Prior art computer systems using transmission lines have utilized a plurality of drivers and receivers, at least one located in each unit in the data processing system. The drivers and receivers are connected to a common transmission line. The various units and their associated drivers and/or receivers are distributed along the length of a transmission line and any one of the drivers is capable of applying a signal on the transmission line for receipt by any one, or all, of the receivers in the various units in the system. Known prior art systems using transmission lines for communication utilize drivers with low output impedances. In other words, the drivers are essentially voltage sources and apply a predetermined voltage to the line as opposed to a predetermined current.

It has now become necessary to increase the speed with which signals are transmitted on the transmission line to the point where it is approaching the limiting propagation time for a signal along the transmission line. However, the speed with which signals can be transmitted has been limited substantially below this rate.

The problem can be understood by considering an example where a unit, with both a voltage driver and a receiver, connected at each end of the transmission line, one driver being on applying a voltage signal at one end of the line while the other driver is off, not applying a voltage signal on the line. Assume that the states of the two drivers reverse. The drop in voltage at the end of the line where the driver is switched off starts propagating down the transmission line towards the end where the driver has been switched on. An inherent characteristic of a voltage driver is that it does not apply a voltage to the line until the voltage on the transmission line drops below the voltage it must supply. Accordingly, the drop in voltage from the driver which has been switched "off" travels along the transmission line until it reaches the end of the line where the driver has been switched "on" and at that time the driver that has been switched commences applying a voltage pulse to the line and the new voltage pulse starts travelling back along the line towards the end where the driver was switched "off." It can be seen that the receiver at the end where the driver was switched "off" will not be in a position to reliably sense the signal from the other end of the transmission line until after the voltage signal from the driver, which was switched "on," reaches the receiver. This time is equal to the time for a signal to travel from a driver which has been switched "off" at one end of the line to the opposite end of the line and back to the original point, or twice the propagation time of the line.

Another problem arises because of signal reflections. Each point along the transmission line where a receiver is connected to the line is a tap or connection. As a signal travels down the transmission line and reaches each tap, a reflection is set up which is negative with respect to the original signal and the reflection travels down the transmission line subtracting from the original signal as it travels. If the signal on the transmission line is to be sensed reliably before the reflection damps out, the signal required of each driver must be large. The required driving voltage under these conditions is equal to twice the total of the change in voltage, from the threshold of the receiver required to reliably switch the receiver plus the maximum noise signal due to line reflections.

SUMMARY OF THE INVENTION

Briefly, an embodiment of the present invention is in a signal transmission receiving system. Included therein is a transmission line bidirectional along its entire length. An impedance terminates each end of the transmission line. First and second line drivers each have an output connected at a respective point on the transmission line. A first state of a line driver presents effectively an open circuit to the transmission line and a second state applies a current signal to the transmission line, causing a corresponding voltage signal on the transmission line. A receiver has an input connected to the transmission line and responds to the presence or absence of a voltage signal on the transmission line exceeding a predetermined threshhold value caused by any one of the line drivers for forming, respectively, first and second output signals. Each line driver is characterized in the second state for changing the current on the transmission line so as to change in a predetermined direction the voltage level, if any, on the transmission line caused by current from another line driver.

The driver described above is referred to herein as a current source. By the use of a current source as the driver, a signal can be reliably received on the transmission line within the one way propagation time on the transmission line. In other words, compared with the prior art voltage sources, the present invention has the effect of doubling the effective transmission rate over the transmission line or of doubling the length of the line for the same transmission rate.

DESCRIPTION OF THE PREFERRED EMBODIMENT

Figures 1, 2:
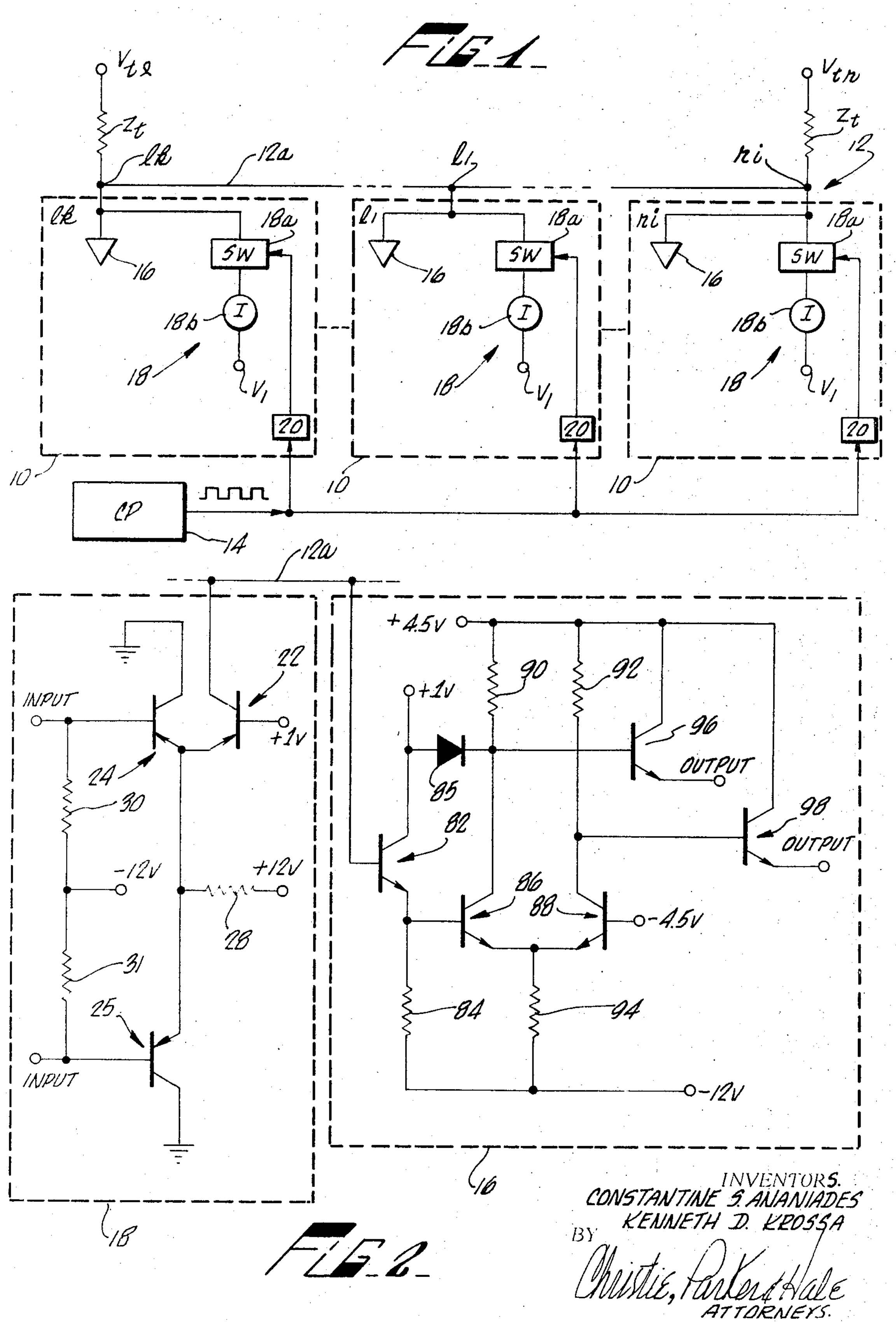
FIG. 1 is a schematic and block diagram of a data processing system and embodying the present invention.
FIG. 2 is a schematic diagram showing an example of a current driver and a receiver for use in the data processing system of FIG. 1.

Refer now to FIG. 1 which shows a schematic and block diagram of a data processing system embodying the present invention. The data processing system includes a plurality of data processing units 10, a transmission line system 12 and a source of clock pulses 14. Digital signals are transmitted between the various data processing units 10 on the transmission line system. The transmission line system 12 is a two-way communication line in that it is bidirectional along its entire length and signals can be applied to the line by any one of the units 10 and received by any one or more of the units 10. The source of clock pulses 14 synchronize the operation of the units 10.

Figure 3:
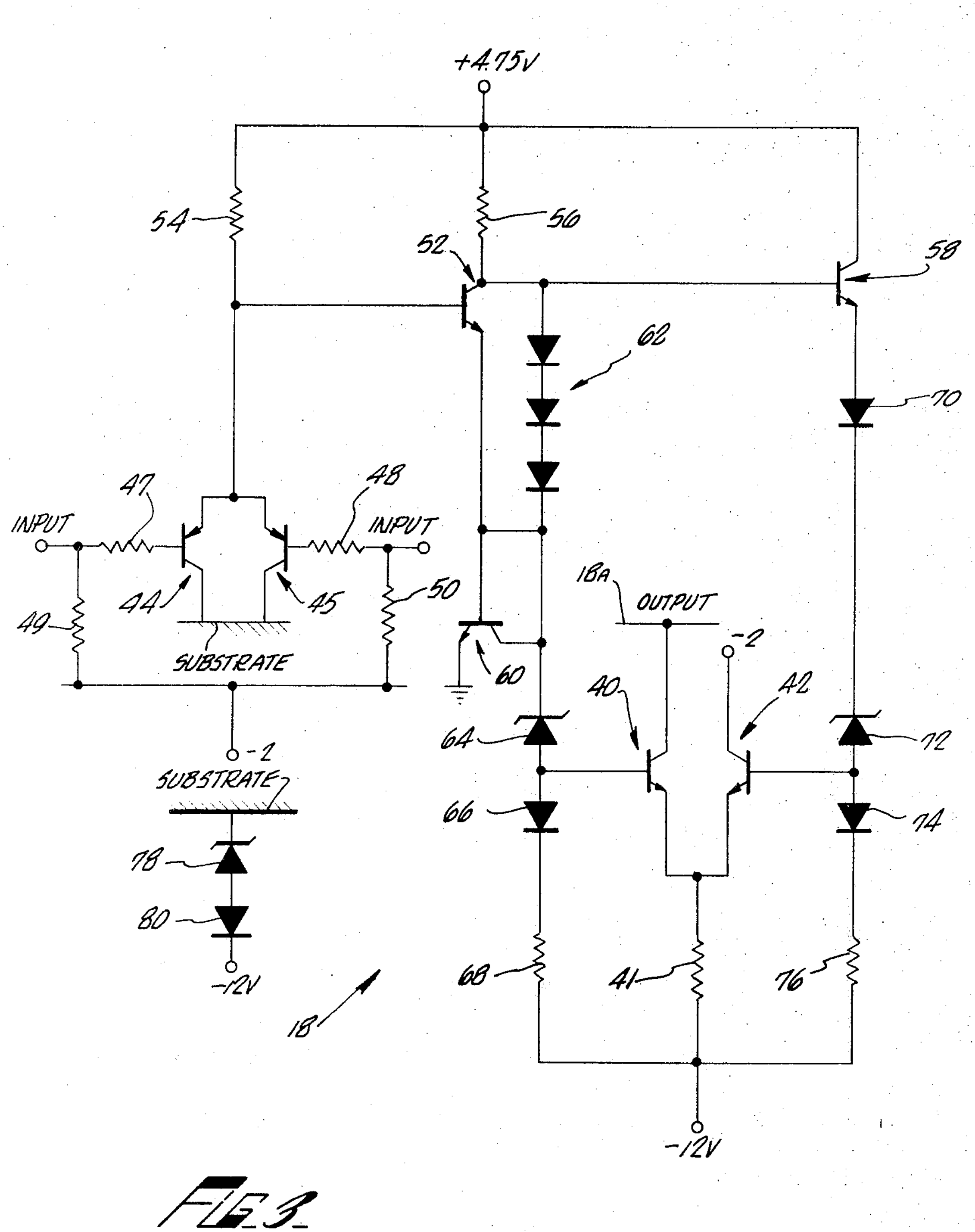
FIG. 3 is a schematic diagram of an alternate current driver for use in the data processing system of FIG. 1.

The transmission line system 12 includes a transmission line 12a and terminating impedances Z*t* at each end of the line. The terminating impedances Z*t* are connected between the respective ends of the line 12*a* and terminating sources of potential V*tl* and V*tr*, corresponding to the left and right ends of the transmission line 12*a*. A second conductor, not shown in FIG. 1, but shown in FIGS. 2 and 3 is ground, and the sources of potential *Vtl* and *Vtr* are obviously connected thereto (by means not shown). Thus the terminating impedances are effectively connected between the transmission line 12*a* and ground. The transmission line 12*a* is a lengthy line and a large number of units 10 are provided in the system. However, for purposes of explanation, only three units 10 are shown in the system and the transmission line 12*a* is broken by dashed lines to indicate that only portions of the line are shown.

A unit 10 connected to the left of center of the transmission line 12*a* is shown in FIG. 1 and identified by the symbol *l*1 in the upper left-hand corner of the dashed outline of the unit. The unit 10 at the left-hand end of the line is identified by the letters "*lk*". The symbol "*l*" indicates a unit located at the left-hand side of the center of the line 12*a* and the characters "1" through "*k*" designate the number of the unit. It is understood that the units 10 to the left in FIG. 1 are designated by the symbols *l*1, *l*2 . . . *l*k, although only units *l*1 and *l*k are shown to simplify FIG. 1. The unit 10 at the right-hand side of the center of the transmission line 12*a* is designated by the symbol ri where the "*r*" indicates that the unit is at the right-hand side of FIG. 1 and the "*i*" represents the number of the particular unit. It is understood that the units 10 include units *r*1, *r*2 . . . *ri*, whereas only unit *ri* is actually shown for purposes of simplification.

Each of the units 10 contain a receiver 16 and high output impedance source or current source driver 18. The current source driver 18 is represented, for purposes of explanation, as a switch 18*a* and a current source source 18*b* connected to a source of potential V1. A timing and control unit 20 is provided in each of the units 10 and controls the switching of the corresponding switch 18*a*.

Each of the timing and control units 20 is connected to the source of clock pulses 14. The control and timing units 20 are synchronized by the source of clock pulses 14 so that the switches 18*a* are switched on and switched off in synchronism with the clock pulses. The time period between adjacent clock pulses is essentially equal to, or slightly greater than twice the propagation time from one end to the other of the transmission line 12*a*. Preferably the switch 18*a* (or current driver) is not permitted to change state in less than the transmission time one way on the transmission line. As a result, the required driving current can be minimized.

It will also be noted that the receiver 16 and current driver 18 are connected to taps on the transmission line 12. The unit *lk* is connected at tap *lk*, the unit *lk*1 is connected at tap *lk*1 and the unit ri is connected at tap *ri*. This arrangement is used to illustrate that the connections for the receiver and current source driver in each unit are connected to the line 12*a* at approximately the same point along the line.

However, it should be noted that, although a preferred embodiment of the invention has a receiver and a driver in each of the units 10, this is not essential to the invention and some of the units 10 could be provided without receivers or without drivers.

Consider now the general operation of the data processing system shown in FIG. 1. Assume that the current source driver 18 in unit *lk* is presently applying a current signal to the transmission line 12*a* and that at the next clock pulse it is switched into a non-conductive condition and that current source driver 18 in unit *ri* is to be switched into a conductive condition and apply a current pulse on the transmission line. To this end, the control and timing unit 20 applies a control signal to the switch 18*a* of unit *lk* causing the current at terminal *lk* to drop. This drop in signal propagates along the transmission line 12*a* towards the terminal *ri*. At the same time, the control unit 20 causes switch 18*a* in unit ri to be switched into a conductive condition and apply a current pulse on the transmission line 12*a* at terminal *ri*. It will be noted that the current at terminal *ri* goes to twice the current level for one current source. The rise in current at terminal *ri* begins to propagate down the line towards the terminal *lk* as the drop in current from terminal *lk* propagates towards the terminal *ri*. Finally, the rise in current at terminal *ri* arrives at terminal *lk* and re-establishes the same current level that appeared at terminal *lk* before the current driver in unit *lk* was switched off. At this time the complete transmission line is stabilized with the current from only the current driver in unit *ri*.

Thus, the maximum time delay between the time one current driver changes and the time any receiver in the system can reliably receive and monitor the signal, is the propagation time from one end to the other of the transmission line 12*a*. This is in marked contrast to the prior art system using voltage source drivers where the minimum time delay is twice the propagation time of the transmission line.

Consider now the output current required from each current driver 18. The receivers 16 are devices which sense voltage. When voltage exceeding a predetermined level is present, a first output signal is formed. When such a voltage is not present, a second output is formed. In other words, the voltage on the line 12*a* must exceed or be below a certain threshold value of voltage before the receiver 16 can reliably sense the signal and provide a corresponding output signal. If $\Delta V$ represents the change in voltage above or below the threshold value to reliably switch a receiver from one state to the other, and if $\delta V$ represents the maximum accumulated reflective voltage that may appear at a receiver input, then in order to maintain a reliable receiver operation without having to wait for reflections to die out on the line, the driver must be capable of producing a current on the transmission line 12*a* of sufficient magnitude to produce a total change in voltage of $2(\Delta V+\delta V)$. However, if a limitation is imposed on the system, such as described above, where the time delay between clock pulses is slightly longer than twice the propagation time from one end of the line to the other of the transmission line 12*a*, then the total change in voltage required to be produced by a current from any of the drivers is reduced and can be expressed by the equation $2\,\Delta\,V+\delta V$. Expressing this in terms of current required by the current drivers 18, where $ZO$ represents the characteristic impedance of the transmission line 12*a*, the current expression becomes $2(2\ \Delta V+\delta V)/ZO$. This is in contrast to the current required if a driver were allowed to switch into conduction in less than twice the propagation time of the line 12*a* where the current required would be $2(2\ \Delta V+2\ \delta V)/ZO$.

Refer now to FIG. 2 and consider the details of one form of the current driver 18 for the units 10. The current driver 18 includes an output transistor 22 and two control transistors 24 and 25. The output transistor 22 has its collector connected to the transmission line 12*a* and its emitter connected to a +12 volt source of potential through a resistor 28. The base electrode of the transistor 22 is connected to a +1 volt source of potential which serves as a reference potential.

The transistor 22 is a PNP type transistor. Accordingly, when the emitter electrode is not held below the base potential, current flows from the +12 volt source of potential through the resistor 28 to the transmission line 12*a*. The output impedance characteristic of the transistor 22, looking back into the collector, is very high. As a result, variations of impedance or voltage upon the transmission line 12*a* and voltage level on the transmission line have little effect on the amount of current delivered to the transmission line 12*a* by the transistor 22 and the transistor 22 can be considered effectively as a current source.

The control transistors 24 and 25 effectively form a transistor AND gate to control the delivery of current by the output transistor 22. The transistors 24 and 25 are PNP type transistors having their collector electrodes connected to ground potential and their emitter electrodes connected in common to the emitter electrode of the output transistor 22. The base electrodes of the transistors 24 and 25 are connected through separate resistors 30, 31 to a − 12 volt source of potential. The base electrodes of the transistors 24 and 25 are the point at which the timing and control unit 20 applies control signals to the current driver 18. In order for the transistor 22 to be in conduction and apply a current signal on the transmission line 12*a*, its emitter electrode must be approximately one half of a volt above the potential of its base electrode. Accordingly, when the base potential of both transistors 24 and 25 are at a positive potential causing the transistors to be in a non-conductive condition, the emitter electrode of the output transistor 22 rises to about 1½ volts positive and the transistor 22 goes into conduction. If the base electrode of either one of the control transistors 24 and 25 is biased to a low potential level causing the corresponding transistor to switch into conduction, the emitter electrode of such control transistor drops to approximately one-half volt positive potential causing the output transistor 22 to be biased into a non-conductive condition so that current is not applied on the transmission line 12*a*.

Consider now an alternate form of the current driver 18 which is shown in FIG. 3. The current driver of FIG. 3 is especially designed for construction using integrated circuit techniques. The current driver 18 is quite similar to the current driver 18 of FIG. 2 in that it includes an output transistor 40 having its collector electrode connected to the transmission line 18*a* and an emitter electrode connected through an impedance 41 to a source of potential. Also, a transistor AND gate controls the control transistor 42.

However, in contrast to the current driver of FIG. 2 which provides an output signal varying between zero and a positive current signal, the current driver in FIG. 3 provides an output signal which varies between zero and a negative output current. To this end, the output transistor 40 is an NPN type transistor and the source of potential connected to the transistor 40 through resistor 41 is a negative 12 volts as opposed to a positive value.

The control transistor 42 is an NPN type transistor having a collector electrode connected to −2 volt source of potential or to ground or to another transmission line terminated to ground and its emitter electrode connected in common to the emitter of the transistor 40 similar to the control transistors 24 and 25 in FIG. 2. The transistor AND gate of FIG. 3 differs from that in FIG. 2 in that the transistor AND gate controls the output transistor 40 indirectly through the control transistor 42. However, it is important to note that the output transistor 40 provides a high impedance output to the line 12*a* and together with the −12 volt source forms a current source.

The transistor AND gate includes a pair of PNP transistors 44 and 45 having emitter electrodes connected in common to the base electrode of a transistor 52 and through a resistor 54 to a +4.75 volt source of potential and having collector electrodes connected in common to the substrate of the integrated circuit. The base electrodes of the transistors 44 and 45 are connected through resistors 47 and 48 to input terminals. The junction between the resistors 47 and 48 and the input terminals are connected to a −2 volt source of potential through biasing resistors 49 and 50. The collector electrode of the transistor 52 is connected through a resistor 56 to the +4.75 volt source of potential and to the base electrode of a transistor 58. The emitter electrode of the transistor 52 is connected to the base electrode of a transistor 60. Three diodes are connected in series between the junction of the transistors 52 and 58 and the base and the collector electrode of the transistor 60. The junction between the transistor 60 and one of the diodes 62 is connected through the cathode to anode electrodes of a Zener diode 64 to the base electrode of the output transistor 40. The junction of the diode 64 and transistor 40 is connected through the serial connection of a diode 66 and a resistor 68 to the −12 volt source of potential. The collector electrode of the transistor 58 is connected to the +4.75 volt source of potential and the emitter electrode is connected through the serial connection of diodes 70, 72 and 74 and resistor 76 to the −12 volt source of potential. The junction between diodes 72 and 74 is connected to the base electrode of the control transistor 42.

The substrate of the integrated circuit is connected through the serial connection of a Zener diode 78 and a diode 80 to the −12 volt source of potential.

In operation, when a high potential is applied to the inputs biasing both transistors 44 and 45 into a non-conductive condition, the base electrode of the transistor 52 rises biasing it into a conductive condition. The circuit between the base of the output transistor 40 and the base of the control transistor 42 is symmetrical up to the cathode of the Zener diodes 64 and 72. Accordingly, the voltage applied to the cathodes of the diodes 64 and 72 determine whether the transistor 40 or the transistor 42 is biased into conduction. Transistor 58 is always in conduction. With the transistor 52 also in conduction, the voltage drop from collector to emitter of the transistor 52 is approximately equal to that between the base and emitter transistor 58. As a result, the diode 70 biases the cathode of the Zener diode 72 at a lower potential than that of the cathode of the Zener diode 64 causing the transistor 40 to be biased into a conductive condition and the transistor 42 into a non-conductive condition. Thus, with both of the transistors 44 and 45 in a non-conductive condition, the output transistor 40 is biased into a conductive condition applying a current pulse on the transmission line 18a.

If either of the transistors 44 or 45 is biased into a conductive condition, the base of the transistor 52 is biased below the potential of the emitter causing the transistor 52 to be biased into a non-conductive condition. With the transistor 52 in a non-conductive condition, the transistor 58 is still in a conductive condition due to the bias of the resistor 56. The voltage drop between the base and emitter electrodes of the transistor 58 is approximately equal to that of one of the diodes 62. Accordingly, there is the equivalent of two diodes drop in potential between the base of the transistor 58 and the cathode of the Zener diode 72, whereas there is the equivalent of three diodes drop in potential between the base of the transistor 58 and the cathode of the Zener diode 64. Accordingly, the base of the transistor 40 is below that of the transistor 42 causing the transistor 42 to be biased into a conductive condition and the output transistor 40 into a non-conductive condition. Thus, no current is delivered to the transmission line 18a.

The diodes 66, 74 and 80 cause the −12 volt source of potential to be effectively disconnected from the output line 18*a* should the power fail. In this manner the current driver is effectively disconnected from the transmission line 18a in the event of a power failure.

With the two current drivers in mind, consider now the receiver 16 shown in the circuit diagram of FIG. 2. The receiver 16 contains an input transistor 82 having a collector connected to a +1 volt source of potential and an emitter connected through a resistor 84 to a −12 volt source of potential. The emitter electrode of the transistor 82 is also connected to the base electrode of a transistor 86. The collector electrode of the transistor 86 is connected through a resistor 90 to a +4.5 source of potential and the emitter electrode is connected through a resistor 94 to the −12 volt source of potential. A diode 85 is connected from anode to cathode between the +1 volt source of potential and the collector electrode of the transistor 86. The transistor 88 is connected, similar to the transistor 86, to a resistor 92 and the resistor 94. The collector electrodes of the transistors 86 and 88 are connected to the base electrodes of output transistors 96 and 98, respectively. The collector electrode of the transistors 96 and 98 are connected to the +4.5 volt source of potential and the emitter electrodes thereof form the output circuits of the receiver.

Consider now the operation of the receiver 16. Assuming no current pulse on the transmission line 12*a*, the transmission line and hence the base electrode of the transistor 82 are at approximately −5 volts by virtue of the sources of potentials V*tl* and Vtr which are −5 volt sources. Thus, the emitter electrode of the transistor 82 is approximately −5.5 volts. Under these conditions the base electrode of the transistor 86 is below the −4.5 volts applied at the base electrode for the transistor 88 and hence the transistor 86 is biased in to a non-conductive condition and the transistor 88 into a conductive condition. Under this condition, the transistor 96 applies between +2.5 and +3.5 volts at the output thereof, whereas the transistor 98 provides between 0 and −1.5 volts at the output thereof. Both outputs of the receiver are loaded with resistors to −2 volts or to a more negative potential, thereby maintaining both output transistors 96 and 98 always in conduction.

Assume now that a current pulse appears on the transmission line 12*a*. Assuming that only one of the current drivers 18 is applying a current signal on the line, the voltage appearing on the transmission line 12*a* will be approximately −2.5 volts. Under these conditions, the potential at the emitter electrode of the transistor 82 will be approximately −3.0 volts. Therefore, the base electrode of the transistor 86 will be above that of the transistor 88 causing the transistor 86 to be biased into a conductive condition and the transistor 88 to be biased into a non-conductive condition. Under this condition, the transistor 96 will have a low voltage at the output thereof and the transistor 98 will supply a high voltage at the output thereof.

The sources of potential depicted in FIGS. 2 and 3 are obviously referenced or connected to ground potential. Thus the current source drivers 18 and receivers 16 are effectively coupled between the transmission line 12*a* and ground.

It is important to ensure that none of the circuits connected to the transmission line 12*a* limit the voltage swing for any range of current permissible on the line 12*a*. In a preferred embodiment only two current drivers are permitted to be applying current to the transmission line 12*a* simultaneously. Accordingly, none of the circuits connected to the transmission line 12*a* should be designed so that they limit the voltage swing on the transmission line 12*a* over the range of current. If for some reason the swing in voltage is limited, such as by a clamp in the receiver or driver, then the system would revert to many of the disadvantages inherent in the prior art systems using voltage driving sources.

It will be noted that the system shown in FIG. 1 only shows one transmission line and one driver and receiver per unit. However, there may be multiple transmission lines for communication between units and multiple current drivers and receivers in each unit within the scope of the present invention.

Although one example of the present invention has been shown by way of illustration, it should be understood that there are many other rearrangements and embodiments of the present invention within the scope of the following claims.

What is claimed is:

1. A signal transmission and receiving system comprising:

a transmission line bidirectional along its entire length;

impedance means terminating each end of said transmission line;

first and second line driver circuits, each having an output circuit connected at a respective point on said transmission line, a first state presenting effectively an open circuit to said transmission line and a second state for applying a current signal to the transmission line causing a corresponding voltage signal on the transmission line; and a receiver circuit having an input circuit connected to said transmission line and responding to the presence or absence of a voltage signal on said transmission line exceeding a predetermined threshold value caused by any one of said line driver circuits for forming, respectively, first and second output signals, each line driver circuit being characterized in said second state for changing the current on the transmission line so as to change in a predetermined direction the voltage level, if any, on the transmission line caused by current from another line driver circuit.

2. A signal transmission and receiving system according to claim 1 wherein said line driver circuits each comprise a sufficiently high output impedance that the level of current applied thereby is essentially independent of voltage level on said transmission line caused by current from the other driver circuit.

3. A signal transmission and receiving system according to claim 1 wherein said line driver circuits each comprise a terminal connected to a source of potential and switching means having an output impedance which is much greater than the impedance of said transmission line, said switching means being operative for connecting said source through the output impedance thereof to the transmission line for applying a current signal thereto.

4. A signal transmission and receiving system according to claim 3 wherein said line driver circuit comprises a transistor having collector and emitter electrodes, the collector and emitter electrodes being coupled to said transmission line and said source, respectively, said transistor being switchable into and out of conduction for applying current pulses to said line, an additional control transistor having base, emitter and collector electrodes, the collector electrode being coupled to a source of potential and the emitter electrode being coupled to the emitter electrode of the first transistor, and circuit means for applying control signals between the base electrodes of said first and control transistors causing a relative potential difference which biases the first transistor into a conductive condition and thereby cause the first transistor to apply a current signal to said transmission line.

5. A signal transmission and receiving system according to claim 4 wherein the base electrode of the first transistor is coupled to a source of potential and the base electrode of the control transistor is coupled to a control means for biasing the base of the control transistor to different levels relative to the potential of the base of the first transistor and thereby cause the first transistor to be switched into and out of conduction.

6. A signal transmission and receiving system according to claim 4 including a separate biasing resistor coupled between the base electrode of each of said transistors and said source of potential coupled to the collectors of said transistors.

7. A signal transmission and receiving system according to claim 6 including a diode coupled in series with each of said resistors to cause the source of potential coupled to the collectors to be effectively disconnected therefrom in the event of a power failure in the source.

8. A signal transmission and receiving system according to claim 1 wherein the driver switching circuit and receiver circuit are unclamped at the transmission line to allow the voltage signal on said line to increase with each additional current applied on the transmission line.

9. A signal transmission and receiving system comprising:

a transmission line bidirectional along its entire length;

impedance means terminating each end of said transmission line;

first and second line driver circuits, each having an output circuit, first and second states for, respectively, applying and not applying a current signal at said output circuit, the output circuit of the line driver circuits being connected at spaced apart points from each other to said transmission line so that the current from either line driver circuit divides into a portion going through the impedance means at one end of the transmission line and a portion going through the impedance means at the other end, thereby forming a corresponding voltage on the transmission line, each line driver circuit being characterized in said second state for introducing current on the transmission line in addition to the current, if any, already present from the other line driver circuit; and a receiver circuit having an input circuit connected to said transmission line and responding to the presence or absence of a voltage signal on said transmission line exceeding a predetermined threshold value caused by one of said line driver circuits for forming, respectively, first and second output signals.

10. A signal transmission and receiving system comprising:

a transmission line bidirectional along its entire length;

impedance means terminating each end of said transmission line;

a plurality of line driver circuits, each having an output circuit, first and second states for, respectively, applying and not applying a current signal at said output circuit and an input circuit for controlling the state thereof;

means for connecting said output circuit of each line driver circuit at a spaced apart point from the other line driver circuits to the transmission line enabling current from any line driver circuit to divide into a portion going through the impedance means at one end of the transmission line and a portion going through the impedance means at the other end, thereby forming a corresponding voltage on the transmission line, each line driver circuit being characterized in said second state for introducing current on the transmission line in addition to current, if any, already present from the other line driver circuits; and a plurality of receiver circuits having an input circuit, the input circuits of said receiver circuits being connected at spaced apart positions to said transmission line with at least one receiver circuit connected on each side of at least one driver circuit, each receiver circuit responding to the presence and absence of a voltage signal on the transmission line exceeding a predetermined threshold value caused by at least one of said line driver circuits for forming, respectively, first and second output signals.

11. A communications system comprising in combination:

a. a two-conductor transmission line having first and second ends, b. first fixed impedance means coupled between the two conductors at the first end of said transmission line, c. second fixed impedance means coupled between the two conductors at the second end of said transmission line, d. a first source of current pulses directly coupled between the two conductors at a first position on said transmission line, said first source of current pulses having an output impedance appreciably greater than the characteristic impedance of said transmission line, said first source of current pulses supplying first current pulses to said transmission line which divide into two portions, one portion propagating in a first direction toward the first end of said transmission line and the other portion propagating in a second direction toward the second end of said transmission line, the propogation of said two portions establishing a first potential difference between the two conductors which potential difference propagates along said transmission line in unison with the two portions of the first current pulses, the magnitude of said first potential difference being proportional to the magnitude of the first current pulses, e. a second source of current pulses directly coupled between the two conductors at a second position on said transmission line remote from said first position, said second source of current pulses having an output impedance appreciably greater than the characteristic impedance of said transmission line, said second source of current pulses supplying second current pulses to said transmission line which divide into two portions, one portion propagating in a first direction toward the first end of said transmission line and the other portion propagating in a second direction toward the second end of said transmission line, the propagation of said two portions establishing a second potential difference between the two conductors at any position on said transmission line where no potential difference exists and further establishes a third potential difference between the two conductors at any position on said transmission where the second potential difference is coincident with the first potential difference established by said first current pulses, the second potential difference propagating along said transmission line in unison with the two portions of the second current pulses, the magnitude of said second potential difference being proportional to the magnitude of the second current pulses and the magnitude of said third potential difference being equal to the sum of the first and second potential differences, and f. potential difference responsive receiver means coupled between the two conductors at a third position on said transmission line, said receiver means being threshold responsive to the potential difference existing between the two conductors at said third position on said transmission line for detecting the presence of any potential difference exceeding the threshold level of said receiver means.

* * * * *